United States Patent [19]
Reynolds

[11] Patent Number: 5,533,840
[45] Date of Patent: Jul. 9, 1996

US005533840A

[54] ROTARY METAL CUTTING TOOL

[75] Inventor: Paul A. Reynolds, Billesdon, England

[73] Assignee: Hydra Tools International PLC, Sheffield, England

[21] Appl. No.: 207,429

[22] Filed: Mar. 8, 1994

[30] Foreign Application Priority Data

Mar. 9, 1993 [GB] United Kingdom ............... 93048387

[51] Int. Cl.⁶ ............................. B23B 27/16; B23B 27/08
[52] U.S. Cl. ................................. 407/41; 407/49
[58] Field of Search .............................. 407/41, 49, 108; 408/232, 233

[56] References Cited

U.S. PATENT DOCUMENTS 4,264,245  4/1981  Lindsay ...................................... 407/49
5,211,516  5/1993  Kress et al. ............................... 407/41

FOREIGN PATENT DOCUMENTS 2180177  9/1989  United Kingdom.

Primary Examiner—M. Rachuba
Assistant Examiner—Kenneth J. Hansen
Attorney, Agent, or Firm—Trexler, Bushnell, Giangiorgi & Blackstone, Ltd.

[57] ABSTRACT

A rotary metal cutting tool comprises an elongate body (1) with a shank (2) and a cutting head (3). At least one channel (4) is provided to receive a twisted cutter blade (5) secured by a clamping cotter (9) located in a recess (7) and screw means (16). The recess and cotter each have at least one flat (15, 16) to prevent cotter rotation; whilst the clamping cotter (9) has a clamping surface (11) of extended length (16) terminating with the lower end face (17) of the cutting head (3), to prevent swarf ingress.

8 Claims, 1 Drawing Sheet

ROTARY METAL CUTTING TOOL

This invention relates to a rotary metal cutting tool, of the general kind described in GB 2180177B.

Such a tool comprises a body having at least one channel in which is clamped a replaceable cutter blade—typically a part-helical, carbide insert—and although this known tool has enjoyed considerable commercial success over a number of years, it is capable of further improvement. For instance in the machining of light alloy, swarf has been known to penetrate a tolerance gap between the tool body and cutter blade, frequently resulting in the blade being jammed in its recess even after removal of its clamping screw, due to the need to provide tolerance for the reasonably easy fitting of a replacement blade and the fact that, when using two axially spaced-apart clamping cotters for a blade of substantial axial length, the lower cotter was spaced above the lower end face of the tool head. In addition, in the fitting of a replacement blade, care had to be taken to ensure non-rotation of the securing cotter upon tightening of the cotter-locking screw, as any such rotation would tend to lift the adjacent blade from out of its seat.

Consequently, a basic object of the present invention is to provide a rotary metal cutting tool of the aforementioned type but of further improved construction.

According to the present invention there is provided a rotary metal cutting tool comprising;

(i) an elongate body having at one end a shank adapted to be clamped in a machine tool and a cutting head provided at the other end of the body;

(ii) at least one channel provided in the head to receive a cutter blade;

(iii) a recess in the body;

(iv) at least one clamping cotter located in the recess and serving to clamp the blade, by wedge action, against a seating surface of the channel by means of a clamping face of the cotter engaging an opposite face of the blade to that engaging the seating surface;

(v) means to urge the cotter into wedge clamping engagement with the blade;

(vi) the recess and cotter each having at least one flat to prevent cotter rotation; and (vii) the clamping cotter having a clamping surface of extended length terminating with the lower end face of the cutting head.

Thus, with the tool in accordance with the invention, firstly the tolerance gap of the prior art construction between the lower end face of the tool head and the blade is eliminated by extending the clamping face of the clamping cotter (or the lower clamping cotter if two clamping cotters per blade are employed) to the lower end face of the cutting head. Consequently, the potential for swarf accumulation in the tolerance gap is eliminated. Secondly, the flat between the or each clamping cotter and it or their recess(es) ensures that the cotter(s) cannot rotate upon tightening of the locking screw but on the contrary the clamping cotter in accordance with the invention positively pulls the blade into firm seating engagement with the seating surface of its channel.

As indicated above, the axial length of the blade may require the use of two, axially spaced apart clamping cotters. Also, to avoid the need to balance the tool, the latter is preferably provided with multiple blades e.g. two 180° apart, three 120° apart, or four 90° apart. Although the blade(s) may be flat, preferably the blade is of helical form, e.g. of tungsten carbide, for which type of blade the cutting tool of the invention is particularly suitable.

Preferably, two flats e.g. in the form of two parallel faces, are provided on the or each clamping cotter. Preferably, the flat(s) extends orthogonally or generally so, with respect to the clamping face of the cotter.

BRIEF DESCRIPTION OF THE DRAWINGS

One example of tool in accordance with the invention is shown in the accompanying drawings, in which.

DETAILED DESCRIPTION OF THE PREFERRED EMBODIMENT

Figure 1:
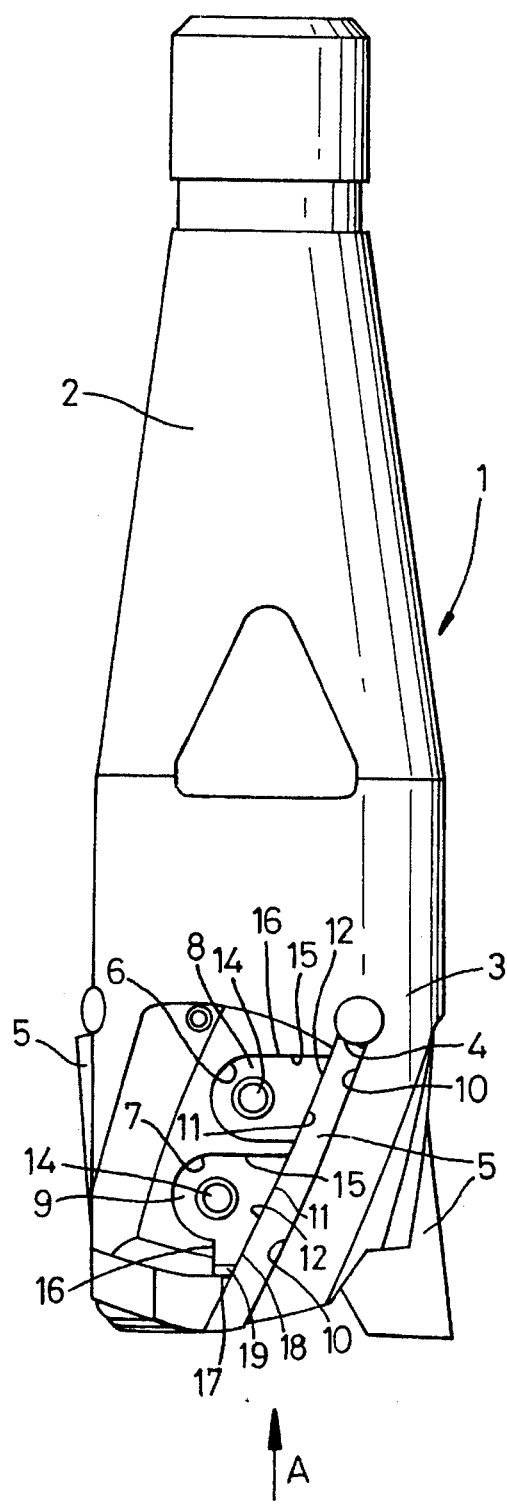
FIG. 1 is a side elevation of a tool in accordance with the invention.
Figure 2:
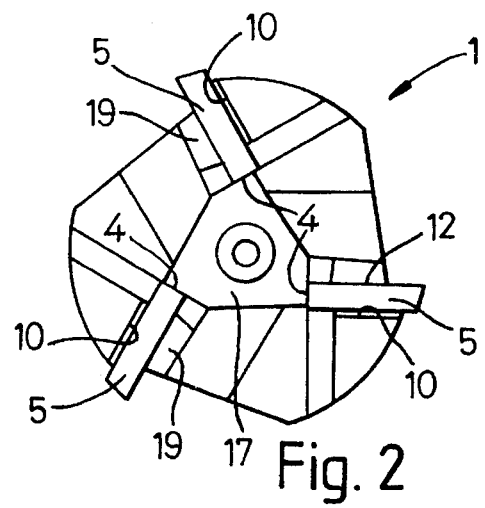
FIG. 2 is a view in the direction of arrow A.
Figure 3:
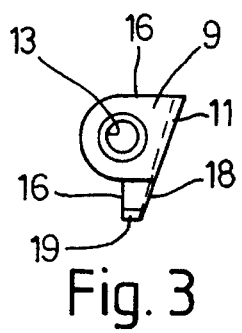
FIGS. 3, 4, 5 and 6, are side, end, opposite side and plan views respectively of one of the lower clamping cotters of FIGS. 1 and 2.
Figure 4:
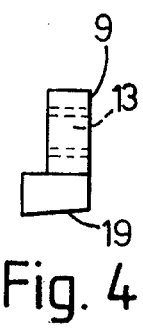
Figure 5:
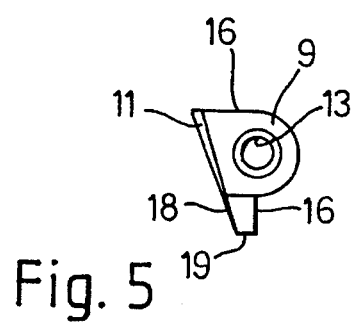
Figure 6:
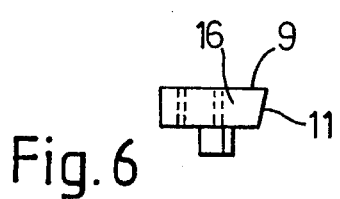

In the drawings, the rotary metal cutting tool comprises an elongate body 1 having at one end a shank 2 adapted to be clamped in a machine tool and at the other end a cutting head 3. Three channels 4 are provided 120° in the head 3 each to receive a replaceable, tungsten carbide cutter blade 5 twisted to helical form. The body member is also provided with two recesses 6, 7 intersecting each channel 4. A first, upper clamping cotter 8 is located in the recess 6, and a second, lower clamping cotter 9 is located in the recess 7. The clamping cotters 8, 9 serve to clamp the associated blade 5, by wedge action, against a seating surface 10 of each channel 4 by means of a clamping face 11 of each cotter engaging an opposite face 12 of the associated blade 5 to that engaging the seating surface 10. Each clamping cotter 8, 9 is provided with a through hole 13 to receive a recessed hexagon head screw 14 to urge each cotter 8, 9 into wedge clamping engagement with the associated blade 5. The recess 6, 7 and the clamping cotters 8, 9 each have respectively a flat 15, 16 to prevent cotter rotation during tightening of the associated screw 14. The lower clamping cotter 7, i.e. nearer to the lower end face 17 of the cutting head 3, has a clamping surface 18 of extended length terminating at 19 so as to be contiguous, or generally so, with the end face 17 of the cutting head.

Other than an extension 18 of its clamping surface 11, the first, upper clamping cotters 8 are identical to the cotters 9.

What I claim is:

1. A rotary metal cutting tool comprising a substantially cylindrical elongate body having a longitudinally extending axis of rotation; a shank provided at one end of said body, which shank is adapted, in use, to be clamped in a machine tool; a cutting head provided at the other end of said body; at least one channel provided in said head to receive a cutter blade twisted to helical form and having a smooth seating face and an opposed, smooth helical clamping face; a seating surface provided by said channel which channel seating surface is complementary to, and engageable by said seating face of said blade; a recess in said body; a clamping cotter located in said recess; a clamping face provided on said clamping cotter which cotter clamping face conforms to helical curvature and engages said clamping face of said blade; means to urge said clamping cotter into wedge clamping engagement with said blade; at least one flat provided on each of said recess and said clamping cotter, wherein said clamping cotter is relatively non-rotationally engaged against said recess to prevent cotter rotation; and said clamping cotter having an extension of its clamping surface, said extension being of such length that said extension terminates with a lower end face of said cutting head.

2. A tool as claimed in claim 1, wherein said blade has an axial length such that a second clamping cotter is provided, spaced from said first mentioned clamping cotter and distal from said lower end face of said cutting head.

3. A tool as claimed in claim 1, wherein three blades, spaced 120° apart, are provided.

4. A tool as claimed in claim 1, wherein two flats are disposed on opposed sides of said clamping cotter.

5. A tool as claimed in claim 2, wherein said second clamping cotter is provided with two flats in the form of parallel faces.

6. A tool as claimed in claim 4, wherein said at least one flat of both said recess and said cotter is orthogonally or generally so, with respect to said longitudinal axis of rotation of said body.

7. A tool as claimed in claim 1, wherein said clamping face of both said cutter blade and said cotter are non-parallel to said longitudinal axis of said body.

8. A tool as claimed in claim 1, wherein said flats of both said recess and said cotter are orthogonal, or generally so, with respect to said longitudinal axis of rotation of said body.

* * * * *